United States Patent [19]

Thorel et al.

[11] 3,819,478

[45] June 25, 1974

[54] TOP SHIELD SEALING SYSTEM OF A NUCLEAR REACTOR

[75] Inventors: John P. Thorel, Northridge; James A. McEdwards, Calabasas, both of Calif.

[73] Assignee: Rockwell International Corporation, El Segundo, Calif.

[22] Filed: Nov. 24, 1971

[21] Appl. No.: 201,870

[52] U.S. Cl. .................................. 176/87, 176/40
[51] Int. Cl. .................... G21c 11/00, G21c 13/06
[58] Field of Search .............................. 176/40, 87

[56] References Cited
UNITED STATES PATENTS

| | | | |
|---|---|---|---|
| 2,991,905 | 7/1961 | Moason et al. | 176/87 X |
| 2,995,505 | 8/1961 | Guild | 176/87 |
| 3,635,792 | 1/1972 | Barker | 176/40 |

*Primary Examiner*—Reuben Epstein
*Attorney, Agent, or Firm*—L. Lee Humphries; Henry Kolin

[57] ABSTRACT

The top shield of a typical fast breeder reactor contains one or more rotatable plugs, the rotatable plugs being separated from the coolant liquid by an annulus adjacent the plug. Two dip seals using liquid sodium in a trough are used in series to seal the primary coolant and cover gas from the top shield annuli. A third dip seal in series with the first two uses a low melting point alloy frozen during normal reactor operation to seal the reactor core cover gas from the operating floor atmosphere.

6 Claims, 3 Drawing Figures

INVENTORS.
JOHN P. THOREL
JAMES A. M<sup>C</sup>EDWARDS
BY Robert G. Upton
AGENT INVENTORS.
JOHN P. THOREL
JAMES A. M<sup>c</sup>EDWARDS BY Robert G. Upton
AGENT

TOP SHIELD SEALING SYSTEM OF A NUCLEAR REACTOR

BACKGROUND OF THE INVENTION

1. Field of the Invention

This invention is in the field of sealing devices for inhibiting the flow of liquid sodium vapors and cover gases into areas that surround the core vessel in nuclear reactors of the type including fast breeder reactors.

In a fast breeder reactor a rotatable plug is often used at the top of the vessel to perform many necessary functions. This plug may contain one or more smaller rotatable plugs within its periphery to facilitate refueling and other types of core maintenance. In order to inhibit the flow of liquid sodium vapor and cover gas to an annulus adjacent or below the rotatable plug, a seal is needed at the bottom of the plug. Difficult problems are encountered when dealing with rotating plugs since conventional sliding seals and the like are subject to leakage, however small they may be. For example, if one or more of the plugs needs to be rotated, it is often necessary to lift the plug off the seals so that the plug can be rotated to a new position, thereby initiating a potential leak path between the relieved seals while the plug is rotated. Accordingly, a need exists for a positive sealing system which is simple, has a built-in redundancy and positively seals the plug during operation of the fast breeder reactor.

2. Description of the Prior Art

The prior art discloses, for the most part, many different types of sliding or rubbing seals commonly associated with rotating machinery. These devices, including sliding seals, are in direct contact between two rubbing parts. The sliding seals may be pressure-actuated by a series of springs, or the seal may be forced into contact by a source of pressure acting upon the seal.

Problems arise in these types of seals in that surface quality must be maintained between opposing rotating parts. Further, rubbing seals of any sort are subject to wear which requires replacement after a specified operating time span.

There is a need, particularly in the nuclear art, for a sealing system that will accommodate relative motion between a rotating plug and the top shield that requires no close tolerance or special material, yet still is relatively maintanance free. The seal must provide a positive barrier to sodium vapor and other cover gas flows that could enter an annulus below a top shield plug or the like.

SUMMARY OF THE INVENTION

We have invented a sealing device to prevent sodium vapor and cover gas from entering the annuli between rotatable plugs of a top shield mounted above the core of a liquid metal cooled fast breeder reactor.

The top shield is sealed by a low melt alloy, the alloy being "frozen" during periods when the rotating plugs are stationary. However, hot oxygen laden sodium vapors and other core cover gases, when in contact with the low melt alloy seals, poison or permeate the alloy, particularly when the sodium is at an elevated temperature. For example, liquid sodium in the reactor core is at a temperature slightly above 1,000° F and gases off quite readily. The resultant vapors attack the alloy used to freeze the top seal annulus when the alloy is in the solid or liquid state. In order to protect the primary top seal, a pair of dip seals in series with the top seal prevent liquid sodium vapors and other cover gases from reaching the low melt alloy of the top fixed seal.

The invention comprises primarily two dip seals in series which utilize liquid sodium in a trough, the dip seal peripheral skirts being suspended therein. A third dip seal is positioned near the top of the shield which utilizes the low melting point alloy as a final positive seal. When this redundant sealing method is utilized, simple roller bearings are incorporated between the rotatable plugs and the top of the core vessel so that no jacking mechanism is needed to rotate the plugs since the plugs are always resting on the roller bearings.

The seals are designed in the following manner. At the bottom of a rotatable plug a circumferential skirt is mounted vertically in such a manner as to dip into a sodium-filled trough attached to the vessel wall. A smaller rotating plug positioned within the larger plug has a similar skirt which dips into a trough attached to the larger plug so that there is a means to seal the smaller plug within the larger plug. Clean deoxygenated sodium from a sodium trough supply system is supplied to the troughs through a sufficient number of feed pipes. The larger amount of sodium is fed directly to the large plug annulus formed by the trough, while a smaller supply is guided through a series of liquid sodium transporting tubes to the inner trough. Since the large plug which supports the inner trough is rotatable, no direct piping connection is made to the inner trough. The liquid sodium exits from the core vessel with sufficient velocity to bridge the annulus gap and provide sodium to the inner trough. The sodium supplied to the lower dip seal is heated to the normal plug temperature of 1,000° to 1,200° F at this particular elevation. The second set of troughs and dip skirts are mounted approximately halfway up at an elevation where the normal shield temperature is less (500° F). The design of this second set of dip seals is similar to the lower seals. These seals provide a break in the convection currents and limit the amount of sodium vapor to the top low melt alloy seal in the upper portion of the annuli. Since this upper portion is at a low temperature where the sodium vapor pressure is such as to limit vaporization to a minute amount of sodium vapor, hence the alloy will not be attacked by the sodium vapor.

The third and final set of seals just below the top of the plug comprises a low melting point alloy dip seal. The skirt portion of the dip seal is suspended in the low melting point alloy which is frozen during operating periods when the rotatable plug is stationary. The dip seal is protected from liquid sodium vapor by the lower and intermediate dip seals so that the alloy in the frozen or liquid state will not react to liquid sodium vapors and other core cover gases. The dip seal is designed to be effective even when the low melting point alloy is in a liquid state, thus providing a final seal to any remaining gases escaping both the lower sets of dip seals.

Accordingly, it is an object of this invention to provide a sealing system to inhibit sodium vapors and other cover gases from entering an annulus below a top low melting point frozen seal in a rotating top shield which requires no close tolerance, no moving part and no physical contact between opposing rotating parts.

It is a further object of this invention to provide redundant dip seals supplied by clean liquid sodium without the need of a mechanical connection between the core vessel and the main rotating plug. It is also an object of this invention to provide clean sodium to redundant seals in a rotatable plug or plugs located within the main plug without the need of a mechanical connection between the main plug and the smaller rotatable plug(s). Since in most installations the smaller plug, located in the main (larger) plug, is located off center, it is an object of this invention to accommodate the variation in thermal movement of the smaller plug at its lowest point within the large plug.

More specifically, it is an object of this invention to provide a pair of properly located redundant dip seals in a top shield plug annulus that prevents liquid sodium vapors or cover gas from entering the annulus below the top frozen dip seal in a rotating plug while providing a means to rotate one or both rotatable plugs without a complicated structure.

Therefore, the seals provide an advantage over the prior art by accommodating for relative motion between opposing moving parts, while requiring no close tolerance nor special material, the dip seals being relatively maintenance free and at the same time providing a positive cover gas barrier.

The above noted objects and advantages of the present invention will be more fully understood upon a study of the following detailed description in conjunction with the detailed drawings.

DESCRIPTION OF THE PREFERRED EMBODIMENTS

Figure 1:
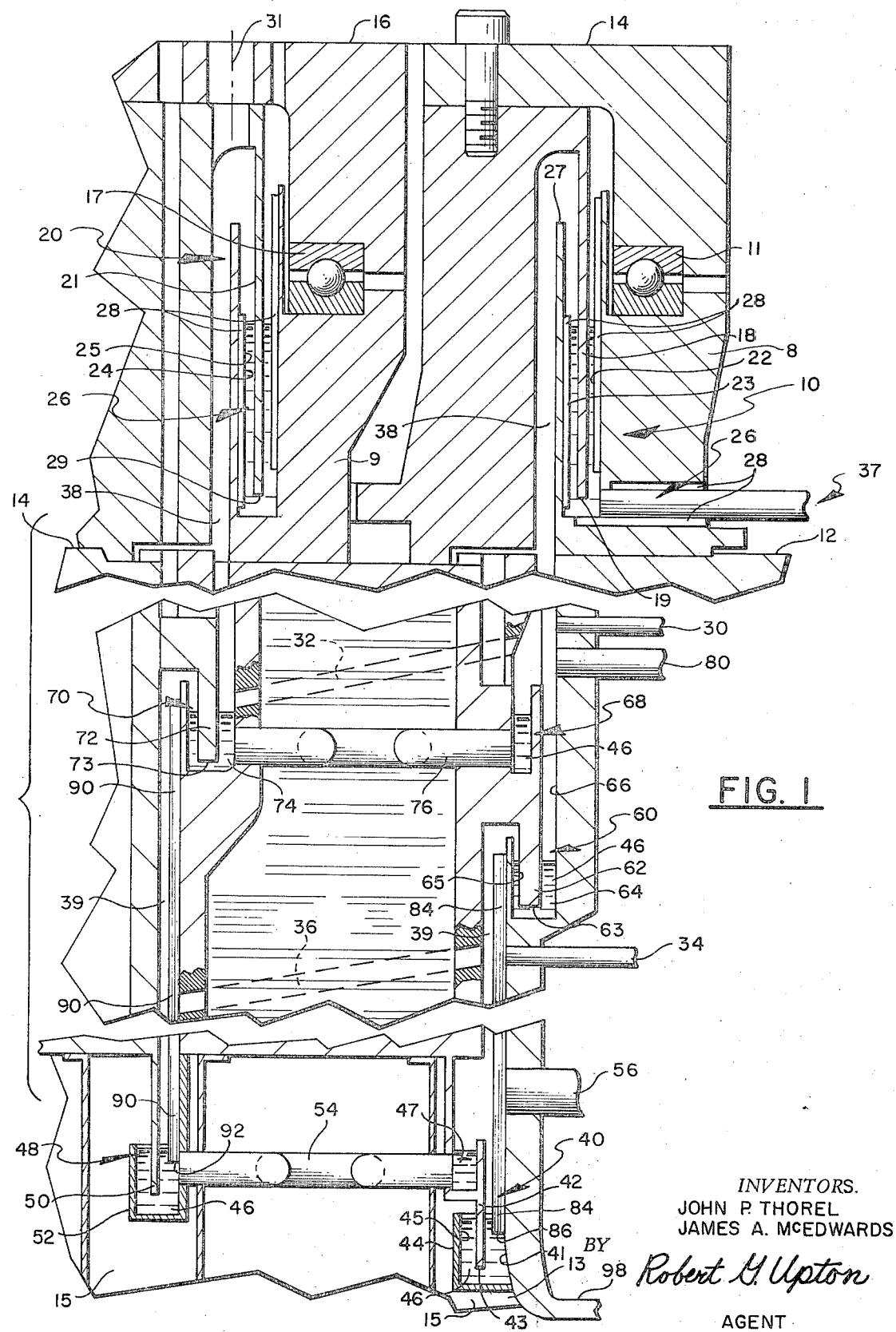
FIG. 1 is a cross-sectional, elevational view partially broken away, of a nuclear reactor top shield having a pair of rotatable plugs attached thereto, the plugs being sealed by a series of dip seals which prevent liquid sodium gases and other cover gases from entering the annuli formed in the top dip seal and the intermediate dip seal.

Referring now to FIG. 1 of the drawings, the top dip seals generally designated as 10 and 20 are positioned between bearing blocks 8 and 9, the bearing blocks being an intermediate structure between the reactor core vessel 12 and the outer large plug 14 and inner plug 16. The large plug 14 houses, within its periphery, a small rotatable plug 16. The large rotatable plug 14 rotates on bearing 11 positioned transverse to the axis of the rotating plug between the rotating plug 14 and the bearing block 8 mounted on core vessel 12. A similar inner bearing 17 is positioned between the larger plug 14 and the smaller plug 16 on bearing block 9. In order to prevent liquid sodium vapor 15 and other nuclear reactor cover gases from entering an annulus between the liquid sodium level and the top dip seals 10 and 20 of the top shield, a system of dip seals in series is provided. At the top of the plug 14 is a dip seal 10 which consists of a skirt portion 18 extending down from the larger top shield plug 14, the annular skirt 18 being parallel with the axis of the large plug 14. The skirt 18 is suspended within a trough 22 which is part of the large plug bearing support 8. The bottom peripheral edge 19 of skirt 18 is suspended well below the upper edge 27, defined by wall 23. The upper trough 22 is filled with a low melting point alloy 26 to a level within trough 22 to completely immerse skirt 18 within the trough. An alloy with a melting point of 105° F, for example, consists of 42.9 percent of Bi; 21.7 percent Pb; 8.0 percent Sn; 5.1 percent Cd; 18.3 percent In; and 4.0 percent Hg. Other low melting point alloys are available and they include, for example, 50 percent bismuth (Bi); 26.7 percent lead (Pb); 13.3 percent tin (Sn); 10 percent cadmium (Cd) that melts at 158° F and 52.5 percent bismuth; 32 percent lead; 15.5 percent tin that melts at 203° F. The depth of trough 22 is designed to resist penetration of any reactor gas overpressure encountered, while the low melt sealing alloy 26 is in a thawed or liquid phase. When it is desired to rotate the large rotating plug 14 on roller bearing 11, the low-melt alloy 26 must be converted from a frozen state to a liquid state. In order to accomplish this, heaters 28 are provided within the trough 22 and in the entering conduit 37. The heaters 28 are on the trough side 23 and the top shield side so that both inner faces of the heaters within the trough are adjacent the low melting point alloy. The heaters 28 are activated, converting the low-melt alloy to a liquid state, thus enabling the rotating plug 14 to now roll on bearing 11. The skirt 18, being well immersed within the melted alloy 26, still provides an effective seal to prevent any remaining sodium vapors or other cover gases in annuli 38 from escaping through the dip seals to the atmosphere.

Another dip seal 20, similar to the dip seal just described, is positioned within the small plug 16 within the large plug 14. Dip seal 20 is comprised of a flange 21 suspended from the rotating plug 16, the walls of the flange or skirt 21 being parallel with the axis of the small plug within large plug 14. The lower edge 29 of skirt 21 is suspended within a trough 24. The inner wall of the trough 24 is a vertically extending skirt 25 which extends up from the small plug bearing support 9. The wall 25 is parallel to the skirt 21, forming the trough 24 between the wall 25 and the wall of bearing support 9. The low-melt alloy 26 is placed within the trough 24 through opening 31 in the top of the small plug 16. This opening is also used to inspect the seals. Heaters 28 are provided within the small plug and are independent of heaters 28 of the large plug so that one or the other may be heated, depending on which plug 14 or 16 is desired to be rotated. Small plug 16 is rotated on bearings 17, as heretofore described. If the small plug is to be rotated on bearings 17, then heaters 28 are activated, thereby melting the low-melt alloy 26, allowing small plug 16 to rotate within large plug 14. The depth of the longitudinally extending skirt 21 within trough 24 is sufficient to prevent any liquid sodium vapors or other cover gases in annuli 38 from escaping through the seal.

The melt alloy dip seals in the large and small plugs 14 and 16 provide a positive seal when both of the seals are frozen so that no liquid sodium vapor remaining in annuli 38 can permeate the frozen seals, thus providing a positive seal for the rotating plugs.

Another pair of dip seals 40 and 48, associated with the outer and inner rotatable plugs 14 and 16, are positioned just above the liquid sodium level of the reactor core vessel between the sodium level and the top of the rotating plugs. Dip seal 40 is comprised of an annular skirt 42 which is immersed within a trough 44, the trough 44 being formed by side wall 45 and wall 41. The lower edge 43 of skirt 42 extends well within the confines of trough 44. Trough 44 is filled with clean deoxygenated liquid sodium through external pipe 56, entering through wall 41 above the trough. The liquid sodium supply from pipe 56 also feeds a secondary feed trough 47. Feed trough 47 feeds liquid sodium through a system of interconnecting piping 54 to transfer liquid sodium to a second dip seal connected with the inner rotating plug 16 within plug 14. The inner dip seal, generally designated as 48, is comprised of a flange or skirt 50 immersed within trough 52. Liquid sodium 46 is transferred from trough 47 through piping system 54 into trough 52. The inner piping system 54 in the large plug is not connected to the small plug, enabling the two plugs to move independently of each other.

It can be appreciated then that sodium vapors and other nuclear cover gases are faced with an initial barrier provided by sodium dip seals 40 and 48, the seal being provided by flanges or skirts 42 and 50 which extend well within sodium filled troughs 44 and 52.

Referring again to FIG. 1, still another pair of sodium dip seals are positioned between the lower sodium dip seals and the upper melt alloy dip seals, the intermediate dip seals being designated as 60 and 70, 60 being associated with the outer plug 14 and 70 with the inner plug 16. The outer dip seal 60, being associated with core vessel 12, consists of an annular skirt 62 suspended within trough 64, the trough being formed by inner wall 65 and outer wall 66 of core vessel 12. The skirt in this instance is much heavier, being strong enough to support the weight of the shield plugs in the event that bearings 11 and 17 need some sort of maintenance. If the bearings need to be serviced, then the plugs can be lowered so that the bottom edge 63 seats within the base of trough 64, thus supporting the weight of the plug. A secondary trough 68 is positioned above dip seal 60 which fills with liquid sodium 46 from feed pipe 80. When the deoxygenated liquid sodium from the sodium trough feed system 150 is fed into inlet pipe 80, the sodium fills both troughs 68 and 64. An overflow system is comprised of an exhaust pipe 84 which extends from the edge of the inner wall 65 down into trough 44 of dip seal 40 so that any overflow of liquid sodium is fed directly into the lower trough 44 for subsequent use. A second dip seal 70, associated with the inner plug 16, is comprised of skirt portion 72, lower edge 73 suspended within trough 74, the trough being fed by an indirect piping connection 76 made to the inner trough 74. Since the inner rotatable plug 16 is independent of plug 14, no direct piping connection is made between the inner and outer plugs, the sodium merely streams across the large plug annulus into the receiving trough 74. A similar overfill spill pipe 90 extends from the inner wall of the inner dip seal 70 down to and into trough 46 of dip seal 48. The overflow of liquid sodium supplied to troughs 64 and 74 of the inner dip seals 60 and 70 spills into troughs 44 and 52 at the bottom of the plug in a controlled manner, thus regulating the amount of liquid sodium in troughs 64 and 74.

The intermediate dip seals 60 and 70 provide a barrier to prevent liquid sodium vapors and cover gases from entering the annuli between seals 60, 70, and top seals 10 and 20 below outer and inner plugs 14 and 16. These intermediate seals also limit convection currents which would otherwise entrain sodium vapor to the top of the top shield annulus. The intermediate dip seals also provide a second barrier to xenon flow, as well as providing limits to the amount of oxygen in the annulus 38. Liquid sodium at a temperature of 500° F is much less subject to emission of sodium gas vapors. It should be clearly pointed out that the middle pair of dip seals 60 and 70 primarily protect the top dip seal from contamination or poisoning of the low melt alloy. These dip seals are not placed exactly in the middle between the bottom and top pair of seals, they are placed at a point on a vertical plane wherever the 500° F temperature occurs in the top shield annuli. The temperature on the vertical plane is the important factor.

Any sodium vapor which is emitted from troughs 60 and 70 is sufficiently cool to condense readily on the walls defining the annuli. Little or no sodium vapor will reach the low melting point alloy in troughs 10 and 20.

It should be pointed out that, for some applications, the lower dip seals 40 and 48 can be eliminated from the system and the intermediate seals 60 and 70 at the 500° F temperature level within any nuclear reactor system will still function to prevent cover gases from entering the annulus above the intermediate seals.

The temperature at the bottom of the rotating plugs comprising the top shield is between 1,000° and 1,200° F, as heretofore described, while the temperature at the top of the rotating plugs is approximately 150° F. It follows then that the base of the rotating plugs 14 and 16, near lip seals 40 and 48, will radially expand outwardly relative to the top of the plugs adjacent seals 10 and 20. The width of troughs 44, 52 then allows for thermal expansion at the base of both rotating plugs 14 and 16. For example, the troughs are wide enough so that flanges 42 and 50 suspended within the troughs cannot contact the base of the overflow pipes 84 and 90 feeding troughs 44, 52 during reactor operation. Any mechanical seal with interacting rubbing surfaces near the core of a nuclear reactor will be adversely affected by the radial thermal growth just described.

Figure 2:
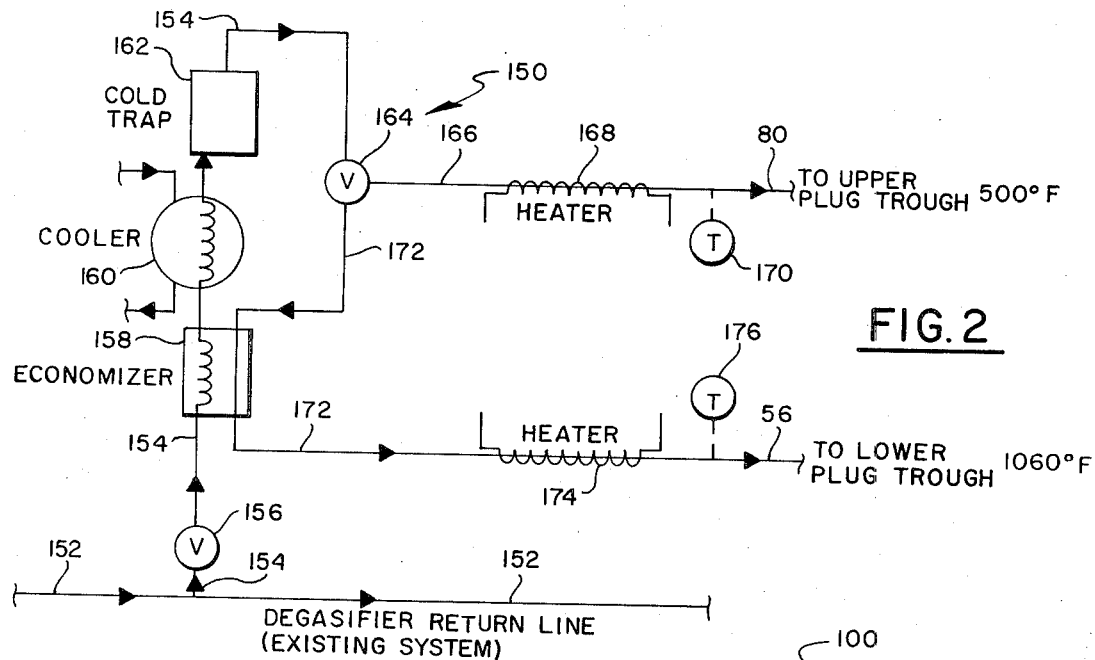
FIG. 2 is a schematic diagram of the sodium trough supply system.
Figure 3:
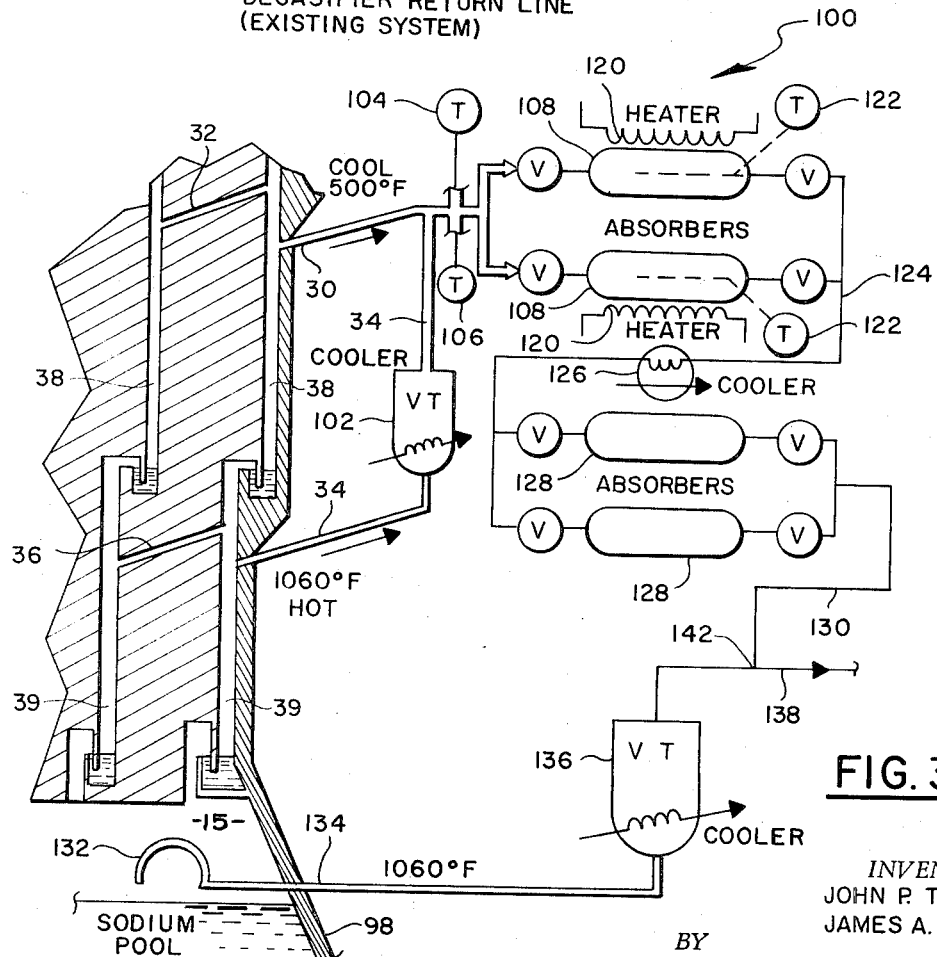
FIG. 3 is a schematic diagram of the pressure equalization system balancing the pressure on either side of the intermediate dip seal, based on the pressure within the reactor core body.

A liquid sodium trough supply system FIG. 2 generally designated as 150 diverts liquid sodium at a temperature of approximately 1,000° F from an existing liquid sodium supply line (degasifier sodium return line) through pipe 152. Conduit 154 directs liquid sodium through valve 156 into an economizer heat exchanger 158, thence into a cooler 160. The sodium is then directed into a cold trap 162 to remove any oxygen entrained within the sodium. The cooled and deoxygenated sodium then is directed via conduit 154 in a valve flow splitter 164. Part of the liquid sodium is directed into pipe 166 through heater 168. The heater heats the cooled sodium to a temperature of approximately 500° F, monitored by temperature gage 170. From there the heated sodium is directed to the trough of the mid sodium dip seals 60 and 70 through conduit 80. The rest of the liquid sodium is guided into pipe 172 by the diverter valve 162, back into economizer 158. The economizer puts heat back into the liquid sodium by exchanging heat from the incoming sodium from conduit 152. The reheated sodium then is directed to heater 174 to heat the deoxygenated sodium to approximately 1,060° F, monitored by temperature gage 176. From there, the clean sodium is directed to the troughs of dip seals 40 and 48 through conduit 56.

In order to obviate the necessity of making the lower two seal troughs 44 and 52 and 64 and 74 deep enough to withstand reactor cover gas pressure variations, the annuli are connected to a gas pressure equalization system. The gas pressure equalization system is connected to the lower and intermediate annuli above the dip seals 40, 48, 60 and 70. The system is connected above dip seals 60 and 70 through conduit 30, conduit 30 providing access for gas flow through conduit 32 which connects the outer annulus formed by plug 14 and core vessel, and the inner gas passage access above dip seal 70 being formed by the inner plug 16 and the outer plug 14. A similar conduit 34 provides access for the gas equalization system and an inner conduit 36 connects the inner and outer annulus, thereby providing a gas flow path between the inner series of dip seals and the outer series of dip seals. The system includes provisions for removing $O_2$ and $H_2O$. Conduits 30 and 34 and their interconnecting passages 32 and 36 between the inner and outer system of dip seals are tied into or in communication with the cover gas and associated pressure of the core vessel via pressure tap 132 at the end of conduit 134 leading into the annulus pressure equalizing and gas purification system generally designated as 100. Since there is a discrepancy in the temperature of the core vessel cover gas at various levels between the core vessel and the shield plugs, a means to compensate for this discrepancy must be employed. Conduits 34, 36 draw sodium vapor from annuli 39 at a temperature of approximately 1,000° F, while conduits 30 and 32 draw gas from annulus 38 at a temperature of approximately 500° F. Therefore, pipe 34 directs the hot sodium vapor into cooler-vapor trap 102 which cools down the vapors to 800° F, feeding into meters 104 and 106. Meters 104 and 106 detect the amount of oxygen and water entrained in the gas. The gas from the annuli 38 and 36 then is directed into a pair of titanium sponge absorbers 108 which are heated by heaters 120, thus trapping the oxygen entrained within the gas. The temperature within absorbers 108 is monitored by gages 122. The deoxygenated gas then is transported into conduit 124 through cooler 126 into an additional pair of synthetic Zeolite condensing absorbers 128 which condense out any remaining residue impurities within the cover gas from the annuli 38 and 39. The purified gas then enters pipe 130 leading to juncture 142. Simultaneously, liquid sodium vapor and other core cover gases are conducted through conduit 134 towards vapor trap cooler 136 and thence into juncture 142 where the opposing gases merge and are then directed via pipe 138 to reactor pressure control valves (not shown) which function to vent and provide make-up cover gas to the reactor core. It should be generally noted that the fast breeder reactor core is contained in an overall containment vessel which is at a slightly lower barometric pressure than atmosphere. The gas equalization system thus provides for equalizing of pressures above and below each of the first trough means and second trough means, i.e., in volumes 38, 39 and 15. The low annuli are connected to each other by a single pipe 36, as are the upper annuli by the single pipe 32. The lines from the lower and upper annuli are then brought together through a cooler and vapor trap 102, the system then being connected to the cover gas pressure control system 100. It should be noted here that the pressure equalization system is not a continuous gas supply system but only allows sufficient gas to leave or enter the annuli 38 or 39 and the volume above the liquid sodium pool to equalize the pressure in such three volumes.

It should be noted here that this type of seal could be utilized in other rotating machinery applications wherein it is important to prevent highly reactive or volatile gases from entering an annulus or the surrounding atmosphere.

We claim:

1. A sealing device to prevent liquid metal vapor and cover gas from entering an annulus adjacent a top shield containing one or more rotatable top shield plugs above the core of a liquid metal-cooled nuclear reactor comprising;

a normally fixed seal between the outer periphery of a top shield plug and a reactor core vessel, a first annular trough means connected to a wall of the reactor core vessel adjacent the top shield plug and below said fixed seal, a first annular dip skirt means connected to and suspended from said top shield plug, the skirt partially extending into said annular trough means, and a source of liquid metal, in the liquid state throughout normal reactor operation, in said trough means, said liquid metal being on both sides of said skirt means during operation to provide a barrier to cover gases from reaching the fixed seal adjacent the top shield plug and said reactor core vessel.

2. The invention as set forth in claim 1 wherein said fixed seal includes a trough and skirt connected to said core vessel and said plug, a liquid metal freezable to a solid state below temperatures between 150° and 250° F in said trough to form a fixed seal with said skirt, said liquid metal being heatable to a liquid state to thaw said fixed seal when relative motion is desired between said core vessel and said plug.

3. The invention as set forth in claim 1 further comprising a second annular trough means and a second dip skirt means between said reactor core vessel and said top shield plug, said second trough means and dip skirt means being spaced from and positioned vertically below said first trough means and dip skirt means in series therewith, said second trough means and dip skirt means providing an additional barrier to cover gases from said reactor core from reaching said fixed seal.

4. A sealing device to prevent sodium vapor and cover gas from entering an annulus adjacent a top shield containing one or more rotatable top shield plugs above the core of a liquid metal-cooled nuclear reactor comprising:

a first annular trough means connected to a wall of a reactor core vessel adjacent a top shield plug, a first annular dip skirt means connected to and suspended from said top shield plug, the skirt partially extending into said annular trough means, a source of liquid metal, in the liquid state throughout normal reactor operation, in said trough means, said liquid metal being on both sides of said skirt means to provide a barrier to cover gases from reaching a fixed seal adjacent the top shield plug and said reactor core vessel, a second annular trough means and a second dip skirt means between said reactor core vessel and said top shield plug in series with said first annular trough means and first dip skirt means, said second annular trough means and dip skirt means providing an additional barrier to cover gases from said reactor core from reaching said fixed seal, gas pressurization equalization system to equalize the gas vapor pressure between annuli between the top shield outer periphery and said reactor core vessel above and below said first and second trough means, said pressure equalization system including a first conduit positioned intermediate said first and second trough means, a second conduit connected between said first trough means and said second trough means, said second conduit being connected to said first conduit, a first vapor trap cooler in line between said conduits, said cooler serving to cool down gas vapors between said first and second trough means so that gas vapor therefrom is at the same temperature as the gas vapor above said first trough means, absorber means downstream from said conduits for removing any oxygen entrained in said gas vapors, a third conduit leading from said condenser to a vent at containment vessel pressure, and a fourth conduit connected to said core vessel leading from a space above a liquid sodium pool in said reactor core vessel, said fourth conduit having a second vapor trap cooler in line therewith for cooling down gas emanating from said sodium pool, said fourth conduit being in flow relation to said third conduit.

5. A sealing device to prevent sodium vapor and cover gas from entering an annulus adjacent a top shield containing one or more rotatable top shield plugs above the core of a liquid metal-cooled nuclear reactor comprising;

a first annular trough means connected to a wall of a reactor core vessel adjacent a top shield plug, a first annular dip skirt means connected to and suspended from said top shield plug, the skirt partially extending into said annular trough means, a source of liquid metal, in the liquid state throughout normal reactor operation in said trough means, said liquid metal being on both sides of said skirt means to provide a barrier to cover gases from reaching a fixed seal adjacent the top shield plug and said reactor core vessel, a second annular trough means and second dip skirt means between said reactor core vessel and said top shield plug in series with said first annular trough means and first dip skirt means, said second annular trough means and dip skirt means providing an additional barrier to cover gases from said reactor core from reaching said fixed seal, a trough sodium supply means including an economizer means connected to a liquid sodium supply source, cooler means downstream from said economizer means for cooling liquid sodium from said economizer means, a cold trap downstream from said coolant means for deoxygenating said liquid sodium, and, valve means downstream from said cold trap for splitting said deoxygenated liquid sodium into first and second flow paths, said first flow path feeding said first annular trough means, said second flow path directing liquid sodium back through said econimizer means for exchanging heat from said incoming sodium to the sodium in said second flow path, the more highly heated deoxygenated sodium then being directed into said second annular trough means.

6. A sealing device to prevent liquid metal vapor and cover gas from entering an annulus adjacent a top shield containing one or more rotatable top shield plugs above the core of liquid metal-cooled nuclear reactor comprising;

an annular trough means connected to a wall of a reactor core vessel adjacent a top shield plug, an annular dip skirt means connected to and suspended from said top shield plug, said skirt partially extending into said annular trough means, a source of liquid metal, in the liquid state throughout normal reactor operation, in said trough means, said liquid metal being on both sides of said skirt means during operation to provide a barrier to the exit of cover gases, a fixed seal adjacent the periphery of the top shield plug and top reactor core vessel spaced above said trough means and said skirt means, and means to equalize the gas vapor pressure between the annulus between the fixed seal adjacent said top shield periphery and said reactor core vessel above and a vapor-containing volume below said annular trough means.

* * * * *

UNITED STATES PATENT AND TRADEMARK OFFICE
CERTIFICATE OF CORRECTION

PATENT NO. : 3,819,478
DATED : June 25, 1974
INVENTOR(S) : John P. Thorel et al

It is certified that error appears in the above—identified patent and that said Letters Patent are hereby corrected as shown below:

On the front page under References Cited [56], "Moason et al" should read --Monson et al--.
Column 6, line 56, "162" should read --164--.
Column 7, line 33, "36" should read --39--.

Signed and Sealed this

Thirty-first Day of August 1976

[SEAL]

Attest:

RUTH C. MASON
Attesting Officer

C. MARSHALL DANN
Commissioner of Patents and Trademarks